United States Patent
Bernhardt et al.

(10) Patent No.: US 10,902,720 B2
(45) Date of Patent: Jan. 26, 2021

(54) TRAFFIC LIGHT SIGNAL ADJUSTMENT NOTIFICATION IMPROVEMENT

(71) Applicant: HERE Global B.V., Eindhoven (NL)

(72) Inventors: Bruce Bernhardt, Wauconda, IL (US); Jingwei Xu, Buffalo Grove, IL (US); Ivan Ivanovic, Berlin (DE)

(73) Assignee: HERE Global B.V., Eindhoven (NL)

(*) Notice: Subject to any disclaimer, the term of this patent is extended or adjusted under 35 U.S.C. 154(b) by 161 days.

(21) Appl. No.: 15/892,486

(22) Filed: Feb. 9, 2018

(65) Prior Publication Data
US 2019/0251838 A1    Aug. 15, 2019

(51) Int. Cl.
*G08G 1/083*    (2006.01)
*G01C 21/34*    (2006.01)
*G05D 1/02*    (2020.01)
*G08G 1/01*    (2006.01)
*G08G 1/0968*    (2006.01)
(Continued)

(52) U.S. Cl.
CPC ......... *G08G 1/083* (2013.01); *G01C 21/3415* (2013.01); *G05D 1/0285* (2013.01); *G08G 1/012* (2013.01); *G08G 1/0112* (2013.01); *G08G 1/0133* (2013.01); *G08G 1/0141* (2013.01); *G08G 1/0145* (2013.01); *G08G 1/087* (2013.01); *G08G 1/096725* (2013.01); *G08G 1/096741* (2013.01); *G08G 1/096775* (2013.01); *G08G 1/096822* (2013.01); *G08G 1/096844* (2013.01); *G08G 1/096883* (2013.01)

(58) Field of Classification Search
CPC ...... G08G 1/083; G08G 1/0112; G08G 1/012; G08G 1/0133; G08G 1/0141; G08G 1/0145; G08G 1/087; G08G 1/096725; G08G 1/096741; G08G 1/096775; G08G 1/096822; G08G 1/096844; G08G 1/096883; G01C 21/3415; G05D 1/0285
See application file for complete search history.

(56) References Cited

U.S. PATENT DOCUMENTS 7,868,783 B2    1/2011    Bachelder
9,679,487 B1    6/2017    Hayward
(Continued)

FOREIGN PATENT DOCUMENTS

DE    102015013467 A1    4/2017

OTHER PUBLICATIONS

California PATH Program;, "Investigating the Potential Benefits of Broadcasted Signal Phase and Timing (spat) Data Under Intellidrive", University of California, Berkeley, May 20, 2011, pp. 1-98.
(Continued)

*Primary Examiner* — Hussein Elchanti
(74) *Attorney, Agent, or Firm* — Lempia Summerfield Katz LLC

(57) ABSTRACT

A method is provided for traffic light signal phase and timing control (SPaT) status and notification message delivery. The method includes collecting traffic flow, incident, and emergency vehicle information on a predetermined portion of a road geometry network. The method dynamically adjusts the SPaT information for a traffic light signal in the predetermined portion of the road geometry network based on the information collected, and delivers a normal or abnormal SPaT status change with the adjusted SPaT information.

23 Claims, 7 Drawing Sheets

(51) Int. Cl.
   *G08G 1/087*       (2006.01)
   *G08G 1/0967*      (2006.01)

(56) References Cited

U.S. PATENT DOCUMENTS

| | | | | |
|---|---|---|---|---|
| 2005/0187701 | A1* | 8/2005 | Baney | G08G 1/096716 |
| | | | | 701/117 |
| 2009/0167561 | A1* | 7/2009 | Liang | G08G 1/0104 |
| | | | | 340/907 |
| 2009/0287401 | A1* | 11/2009 | Levine | G01C 21/3492 |
| | | | | 701/117 |
| 2010/0171640 | A1* | 7/2010 | Delia | G08G 1/07 |
| | | | | 340/907 |
| 2011/0169661 | A1 | 7/2011 | Eichhorst | |
| 2014/0336913 | A1* | 11/2014 | Fino | G01C 21/34 |
| | | | | 701/117 |
| 2016/0148507 | A1* | 5/2016 | Pittman | H04W 4/029 |
| | | | | 340/917 |
| 2016/0260325 | A1 | 9/2016 | Modica | |
| 2016/0358463 | A1* | 12/2016 | Cho | G08G 1/0145 |
| 2017/0084172 | A1 | 3/2017 | Rolle et al. | |
| 2017/0124869 | A1 | 5/2017 | Popple | |
| 2017/0154525 | A1* | 6/2017 | Zou | G08G 1/0145 |
| 2017/0353350 | A1* | 12/2017 | Gussen | H04B 10/11 |
| 2018/0012486 | A1 | 1/2018 | Israelsson | |
| 2018/0075739 | A1* | 3/2018 | Ginsberg | G08G 1/096783 |
| 2018/0143628 | A1* | 5/2018 | Samper | B60W 50/12 |
| 2018/0151064 | A1* | 5/2018 | Xu | G08G 1/0125 |
| 2018/0286228 | A1* | 10/2018 | Xu | G08G 1/0145 |
| 2019/0272747 | A1* | 9/2019 | Raamot | G08G 1/0129 |

OTHER PUBLICATIONS

PCT International Search Report and Written Opinion of International Searching Authority, corresponding to PCT International Application No. PCT/US2019/014903 dated Jul. 24, 2019.

* cited by examiner

TRAFFIC LIGHT SIGNAL ADJUSTMENT NOTIFICATION IMPROVEMENT

FIELD

The following disclosure relates to traffic control, advanced driver-assistance systems (ADAS), autonomous driving and navigation applications, and more particularly to generating improved traffic light signal adjustment notifications.

BACKGROUND

In the area of traffic control, ADAS, autonomous driving and navigation, an intersection plays a critical role for traffic flow management. Among other things, an intersection includes traffic signal(s) that are installed to provide intersection movement state and flow control strategies to increase vehicle capacity through the intersection and to increase safety of the vehicles driving through the intersection. In general, each traffic light in an intersection has an assigned signal phase and timing (SPaT) control strategy. Such information about the intersection may be used by autonomous vehicles, navigation systems, traffic service providers and traffic management agencies to provide additional opportunities utilizing this information.

The Society of Automotive Engineers (SAE) J2735 standard for Dedicated Short Range Communications (DSRC) Message Set Dictionary defines a SPaT format that may be used to describe the current state of a traffic signal system for an intersection and the phases corresponding to the specific lanes in the intersection. This SPaT information may be delivered to a vehicle or navigation system through a DSRC or cellular network as the vehicle is approaching an intersection or is within a certain distance. Traffic signals and traffic signal controllers are also becoming connected devices. For example, the status of the SPaT of the state transitions may be collected in real-time or predicted through engineering analysis. This information may be sent through communications channels to systems that may distribute the information to interested users.

The SPaT information may be pre-cached and stored in a vehicle, as part of a navigation system or in a mobile device. The SPaT information may also be sent to a participating vehicle or device as the vehicle or device approaches the intersection in real-time. An update may also be provided if a change to the SPaT information, such as a predicted change time of the traffic signals, is modified. The updated SPaT information does not convey a reason for the modified SPaT information. Other messaging programs are provided to notify vehicles of the presence of emergency vehicles operating in an area in order to give drivers enhanced awareness and vigilance, however the programs do not specify if any intersections near a vehicle are affected.

SUMMARY

In one embodiment, a method is provided for generating traffic signal adjustment notifications. The method is performed by a signal phase and timing process engine receiving traffic data for a predetermined road segment, including flow data, incident data and emergency vehicle data, and deriving an abnormal status for a traffic signal for the predetermined road segment based on the received traffic data. The signal phase and timing process engine further adjusts a phase and timing for the traffic signal based on the received traffic data and generates a vehicle notification based on the abnormal status and the phase and timing for the traffic signal.

In another embodiment, an apparatus is provided for notifying vehicles of a traffic signal phase and timing change. The apparatus includes a traffic signal database configured to store traffic signal information including traffic flow information, traffic incident information, emergency vehicle information and traffic signal phase and timing information. The apparatus also includes a traffic signal phase and timing processing engine configured to modify a phase and timing for the traffic signal based on an abnormal status derived from the traffic signal information retrieved from the traffic signal database and to generate a change notification for vehicles approaching the traffic signal. The change notification includes modified traffic signal phase and timing information for the traffic signal and the abnormal status. The apparatus further includes a network interface for communicating the change notification to a vehicle communications system.

In another embodiment, a method is provided for generating vehicle instructions based on a traffic signal phase and timing adjustment. The method includes a mobile device associated with a vehicle receiving map data including phase and timing information for a plurality of traffic signals and a phase and timing adjustment notification for a traffic signal. The phase and timing adjustment notification includes an abnormal status for the traffic signal. The method further includes generating a vehicle instruction by the mobile device based on the phase and timing adjustment notification and the abnormal status of the traffic signal.

BRIEF DESCRIPTION OF THE DRAWINGS

Exemplary embodiments of the present invention are described herein with reference to the following drawings.

DETAILED DESCRIPTION

Figure 1:
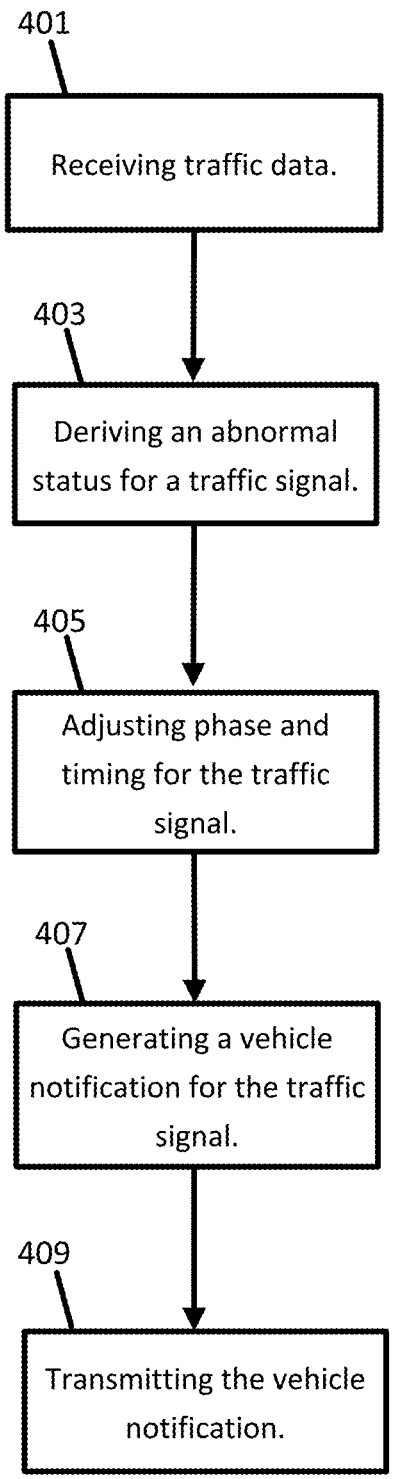
FIG. 1 illustrates an example flowchart for generating traffic signal adjustment notifications.

Services are emerging for notifying vehicles and other devices traveling on a road network based on the present and expected future status of traffic light signals. For example, notification services may deploy a dedicated short range communications (DSRC) system using the Society of Automotive Engineers Surface Vehicle Standard J2735 for notifications. The J2735 standard includes a DSRC message set dictionary defining a set of messages for communicating relevant information to vehicles and other devices. The message set dictionary defines a number of useful messages, such as a set of entries for notifying vehicles and other devices of the current state and change time of traffic light signals in a given area. The messages are designed to improve driver awareness and traffic flow, increasing roadway safety, such as near intersections, and for improving the fuel economy of vehicles. While knowledge and communication of the current and future status of traffic lights has many benefits, current communication systems and standards for delivering traffic light state information do not communicate the reason for status changes.

The present embodiments provide for notifying vehicles and other devices of adjustments to the current state and change timing of traffic light signals, as well as the reason for the adjustments. For example, in an emergency situation, the current state and timing of a traffic light may be modified, such as to accommodate emergency vehicles or to stop traffic flow in order to clear an accident. When the current state and timing of the traffic light is adjusted, a notification may be indicating the reason of the state and timing adjustment, allowing the vehicles and other devices to have additional information for navigation and other decision making processes. In this example, a route may be chosen to avoid a particular traffic signal if the reason for the state and timing adjustment is indicative of a long delay. Conversely, if the reason for the state and timing adjustment is indicative of a short delay, a route through the traffic signal may be chosen.

In an example, a method is provided for traffic light signal phase and timing control (SPaT) status and notification message delivery. The method includes collecting traffic flow, incident, and emergency vehicle information on a predetermined portion of a road geometry network (e.g., roadway). The method dynamically adjusts the SPaT information for a traffic light signal in the predetermined portion of the road geometry network based on the information collected, and delivers a normal or abnormal SPaT status change with the adjusted SPaT information. For example, the notification is provided to vehicles and devices approaching the traffic light signal (e.g., upstream from the traffic light signal), and an abnormal SPaT status may include information regarding the reason for adjusting the SPaT information, such as a traffic light outage, an approaching emergency vehicle, an approaching train, adverse weather conditions, criminal activity, or another traffic event.

The present embodiments provide numerous benefits and may obviate one or more of the drawbacks or limitations in the related art. For example, if a driver or system within a vehicle are made aware of the reason for a SPaT information adjustment, in addition to the updated SPaT information, the driver or system may have an enhanced understanding and awareness of the roadway environment and may better react to changing circumstances. The ability to identify the reason for a traffic light status change may allow the driver to better determine how best to react in order to improve roadway safety, improve fuel economy and to improve roadway mobility and traffic flow. For example, if the updated SPaT information and rationale provide that the expected traffic light change time will be longer than normal because of an approaching train, a different route may be chosen that does not conflict with a temporary road closure due to a corresponding train crossing.

Additionally, navigation and other in-vehicle systems may be improved by better using the SPaT information and abnormal status to alter an intended or future route due recent changes in the roadway environment. For example, if a traffic light signal status update indicates adjusted SPaT information due to an emergency vehicle (e.g., a vehicle passing through an intersection), a routing algorithm may determine a different route if the current route may be restricted by the emergency vehicle. Further, a vehicle safety system may request a status update to determine if any incidents are reported in a particular area of the roadway environment.

Further, current and future messaging standards and systems may be improved by providing for the ability to convey additional information to vehicles and other devices. For example, the current J2735 standard and similar messaging systems do not include any message elements communicating any reason for the traffic light signal and timing status update changes. Accordingly, by improving existing and future messaging standards, dedicated short range communication systems, as well as navigation devices, autonomous driving systems, and other driving systems may be improved by allowing messaging systems and other devices to provide functionality based on the reason for an updated traffic light signal and timing status.

FIG. 1 illustrates an example flowchart for generating traffic signal adjustment notifications. The method is implemented by the system of FIGS. 2-7 (discussed below) and/or a different system. For example, referring to FIG. 2 (discussed below), the method may be performed by SPaT process engine 501 using traffic signal information 503A-503N, backend cloud network 507, cellular tower 505, and DSRC system 509 for a plurality of traffic lights and vehicles. Alternatively or additionally, referring to FIG. 3 (discussed below), the method may be performed by a server 125 and developer system 121. The traffic signal information 503A-503N may be collected by autonomous vehicles, navigation systems or other mobile devices, such as mobile devices 122 as probes 131. Additional, different or fewer acts may be provided. The method is provided in the order shown. Other orders may be provided and/or acts may be repeated or performed in parallel.

At act 401, traffic data is received. For example, referring to FIG. 2 (discussed below), the SPaT process engine 501 receives using traffic signal information 503A-503N from a traffic signal database 503 (e.g., collectively 503A-503N). The traffic data is received for a predetermined road segment, such as data for a particular intersection or data for one or more intersections within a predetermined geographical area. The traffic data includes one or more of traffic flow data, traffic incident data, emergency vehicle data, government agency time plans, or other traffic events.

As discussed above, the traffic data may be retrieved from a traffic signal database (e.g., stored locally, on a server, in cloud based storage, or in another database). For example, the traffic signal database may be part of a larger database that includes high-definition (HD) map data (e.g., storing historical traffic flow and incident data), and may store privilege vehicle information obtained by working with government agencies. Additionally, the database may include real-time traffic flow data, traffic incident data, emergency vehicle data and changes to government agency time plans received from vehicles and devices traveling on the roadway (e.g., probe data), roadway sensors (e.g., traffic light signal data), or another traffic data source. For example, a current or adjusted government agency time plan may include traffic light signal phase and timing (SPaT) control strategy, such as including the current state of the traffic light signal (e.g., green, yellow, red, turn signals, flashing lights, and other signal states) and the timing of changes to the state (e.g., cycling from green to yellow to red, and back to green). Accordingly, the government agency time plan may be indicative of a current state of the traffic signal and timing for future changes to the current state of the traffic signal.

For example, the real-time traffic data may be retrieved on each road segment in between intersections with traffic light installed, including real-time incident information on each road segment, real-time emergency vehicle routing information, and detected traffic light outage information from all sources. Additional or different traffic data may be received, such as weather data, criminal activity data, or other event data (e.g., block party and street fair information) that may impact traffic for a roadway, an intersection, or another traveled throughway. The traffic data may be received from a number of sources and/or stored in a database (e.g., by a backend cloud server via a backend cloud network, or on another server or local computing environment).

Referring back to FIG. 1, at act 403, an abnormal status is derived for a traffic signal. For example, based on the received traffic data, an abnormal status for a traffic signal in the predetermined road segment is determined. The abnormal status is indicative of a reason for adjusting the phase and timing for the traffic signal, such as by indicating a traffic event causing a phase and timing adjustment. For example, the SPaT process engine 501 is configured with an algorithm for determining when an abnormal status is occurring for a traffic signal and for deriving the reason for the abnormal status. Deriving the abnormal status may also include predicting a duration of the abnormal status. For example, an algorithm may be configured to derive the abnormal status based on detected traffic light outage information, traffic flow data, traffic incident data, emergency vehicle data (e.g., ambulance, police, fire, or other vehicles dispatched for an emergency), or other traffic events. Further, the traffic data may provide an expected duration of the abnormal status, or the algorithm may derive the expected duration of the abnormal status by analyzing the traffic data and/or leveraging historical data to predict the duration of the abnormal status.

At act 405, phase and timing is adjusted for the traffic signal. For example, the phase and timing of the traffic signal may include the current state of the traffic light signal (e.g., green, yellow, red, turn signals, flashing lights, and other signal states) and the timing of changes to the state (e.g., cycling from green to yellow to red, and back to green). Adjusting the phase and timing of the traffic signal may include changing the current state of the intersection (e.g., to red in case of an emergency), and adjusting the timing of future changes to the state (e.g., delaying a red light from changing for the duration of the emergency). Accordingly, adjusting the phase and timing of the traffic signal may provide for control of the traffic light, and/or may provide drivers with advanced warning of the change in status and timing for autonomous driving and navigational purposes.

The phase and timing information may be adjusted based on the received traffic data, such as in response to deriving an abnormal status for the traffic signal. Alternatively, the abnormal status of the traffic signal may be derived from the adjusted phase and timing information. An algorithm may be configured to generate SPaT timing and phase information adjustments, such as by adaptively adjusting the SPaT timing and phase information corresponding to the traffic information in order to optimize the traffic flow. For example, the SPaT process engine 501 is configured with an algorithm for adjusting the phase and timing information. Alternatively, the SPaT process engine 501 receives an adjusted phase and timing for the traffic signal, and performs act 403 based on the received adjustment. Alternatively, the SPaT process engine 501 may receive and store, rather than adjusting, the adjusted phase and time plan received from government agency and or a traffic light signal communication system.

At act 407, a vehicle notification is generated for the traffic signal. The vehicle notification is generated based on both the abnormal status and the adjusted phase and timing for the traffic signal. The vehicle notification may also include the predicted duration of the abnormal status. The vehicle notification may be generated as part of a navigation instruction, such as a warning based on the predicted duration of the abnormal status and/or by providing an alternative route based on the predicted duration of the abnormal status. Additionally or alternatively, the vehicle notification may include a driving instruction based on the predicted duration of the abnormal status, such as by providing a driving instruction for the control of an autonomous vehicle, or as a driver warning or instruction based on the abnormal status.

At act 409, the vehicle notification is transmitted. For example, the vehicle notification may be provided to one or more vehicles traveling or in close proximity to a predetermined road segment. For example, the adjusted SPaT data may be provided data to vehicles approaching a traffic signal or road segment, such by providing a map update, a navigation update, a warning message, a driving instruction, or another notification. The vehicle notification may also be provided as a notification of the status of an abnormal/normal SPaT change. An abnormal status may include the reason for the abnormal statues, such as a traffic light outage, a train arrival, an emergency vehicle approaching, or another traffic event. Different reasons for the abnormal status may be categorized and according to the categorization within the vehicle notification.

The notification may be provided as part of a navigation system, an autonomous driving system, as part of a mobile device network. Further, the notification may be provided according to a governmental and/or local vehicle communication, such as according to a messaging standard. For example, the notification may be implemented as an optional extension to the J2735 messaging standard. The Society of Automotive Engineers J2735 surface vehicle standard for dedicated short range communications (DSRC) message set dictionary may be modified or extended to include an abnormal status and/or change reasoning. In an example, the J2735 standard may be extended by including one integer in the messaging standard with different values indicating different reasons or categories of reasons for a SPaT change. Additional integers may be provided, such as an integer indicating an estimated duration of the abnormal event. Other messaging standards may be likewise or alternatively modified and/or extended. For example, J2735 SPaT data could be stored and transmitted using a JSON file, XML file, or other data storage format as long as the vehicle can read and interpret the data agree upon the format defined.

Various notification methodologies and intermediaries may be used to transmit the vehicle notification. For example, the notification may be provided through an intermediary to an end customer. Notification methodologies may include radio data system (RDS) messages over the air radio interface, transport protocol experts group (TPEG) service by connected hypertext transfer protocol (HTTP) or user datagram protocol (UDP) protocol, dedicated short range communication (DSRC) broadcasting data, etc. Additional, different and future methodologies may be used.

Figure 2:
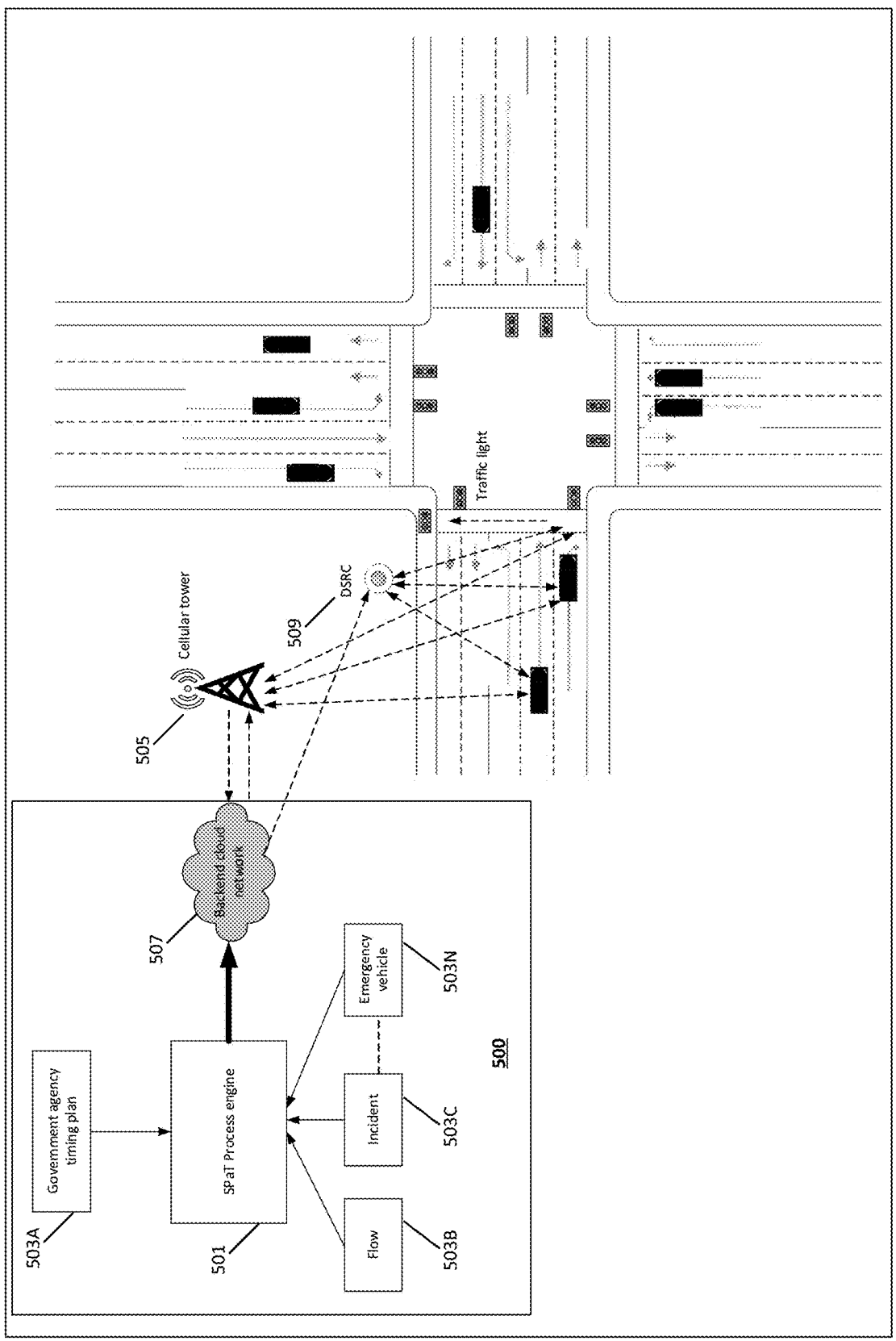
FIG. 2 illustrates an example system for notifying vehicles of a traffic signal phase and timing change.

FIG. 2 illustrates an example system for notifying vehicles of a traffic signal phase and timing change. The system 500 includes a traffic signal phase and timing processing engine 501, a traffic signal database 503, traffic signal information 503A-503N, and a backend cloud network 507. Further, system 500 may interact with and may be part of a larger system including a cellular tower 505, DSRC system 509, one or more vehicles, one or more traffic light signals, and other components. Additional and different components may be included.

The traffic signal phase and timing processing engine 501 may be provided in a cloud-based server or other computing environment, including hardware and/or software components and algorithms configured to notify vehicles of traffic signal phase and timing changes. The traffic signal phase and timing processing engine 501 may perform one or more methods, such discussed above with respect to FIG. 1. Additional and different methods may be performed. For example, traffic signal phase and timing processing engine 501 is configured to retrieve the traffic signal information 503A-503N for a traffic signal. A traffic signal database 503 (not depicted) may be provided to store traffic signal information 503A-503N (e.g., collectively provided as traffic signal database 503). The traffic signal information includes traffic signal information 503A, traffic flow information 503B, traffic incident information 503C, and emergency vehicle information 503N. Additional and different traffic signal information may be provided. For example, at least a portion of the may include government agency traffic signal timing information 503A (e.g., dynamically based on real-time updates, as bulk updates of plan changes, or via another updating scheme). Further, at least a portion of the traffic signal information 503A-503N may be received from a plurality of vehicles traveling or having traveled on the roadway (e.g., via a mobile network and cellular tower 505).

Based on the retrieved traffic signal information 503A-503N, the traffic signal phase and timing processing engine 501 modifies the phase and timing for a traffic signal based on an abnormal status derived from the traffic signal information 503A-503N. The traffic signal phase and timing processing engine 501 further generates a change notification for one or more vehicles approaching the traffic signal and/or traveling the roadway. The change notification includes both the modified traffic signal phase and timing information for the traffic signal and the abnormal status. The notification is provided to a vehicle via an intermediary, such as a cellular tower 505 (e.g., a mobile network or another network) or via a DSRC system 509 (vehicle communications system) for the traffic signal and/or roadway. The traffic signal phase and timing processing engine 501 may communicate the notification to the cellular tower 505 and/or DSRC system 509 via a backend cloud network 507 (e.g., a network interface).

Accordingly, the traffic signal phase and timing processing engine is configured to perform a method for traffic light SPaT phase and timing control and notification message delivery. The method includes collecting flow, incident, and emergency vehicle information on the predetermined parts of the road geometry network. The traffic signal phase and timing processing engine is provided as a system and algorithm to dynamically adjust SPaT phasing and timing information and to deliver a normal or abnormal notification of a SPaT status change and adjusted SPaT timing data to the vehicles approaching a traffic light signal (e.g., upstream from the traffic light signal). The abnormal SPaT status may include a traffic light outage, approaching emergency vehicles, an approaching train, construction, weather, criminal activity, and traffic accidents. Additional and different abnormal statuses may be indicated.

Figure 3:
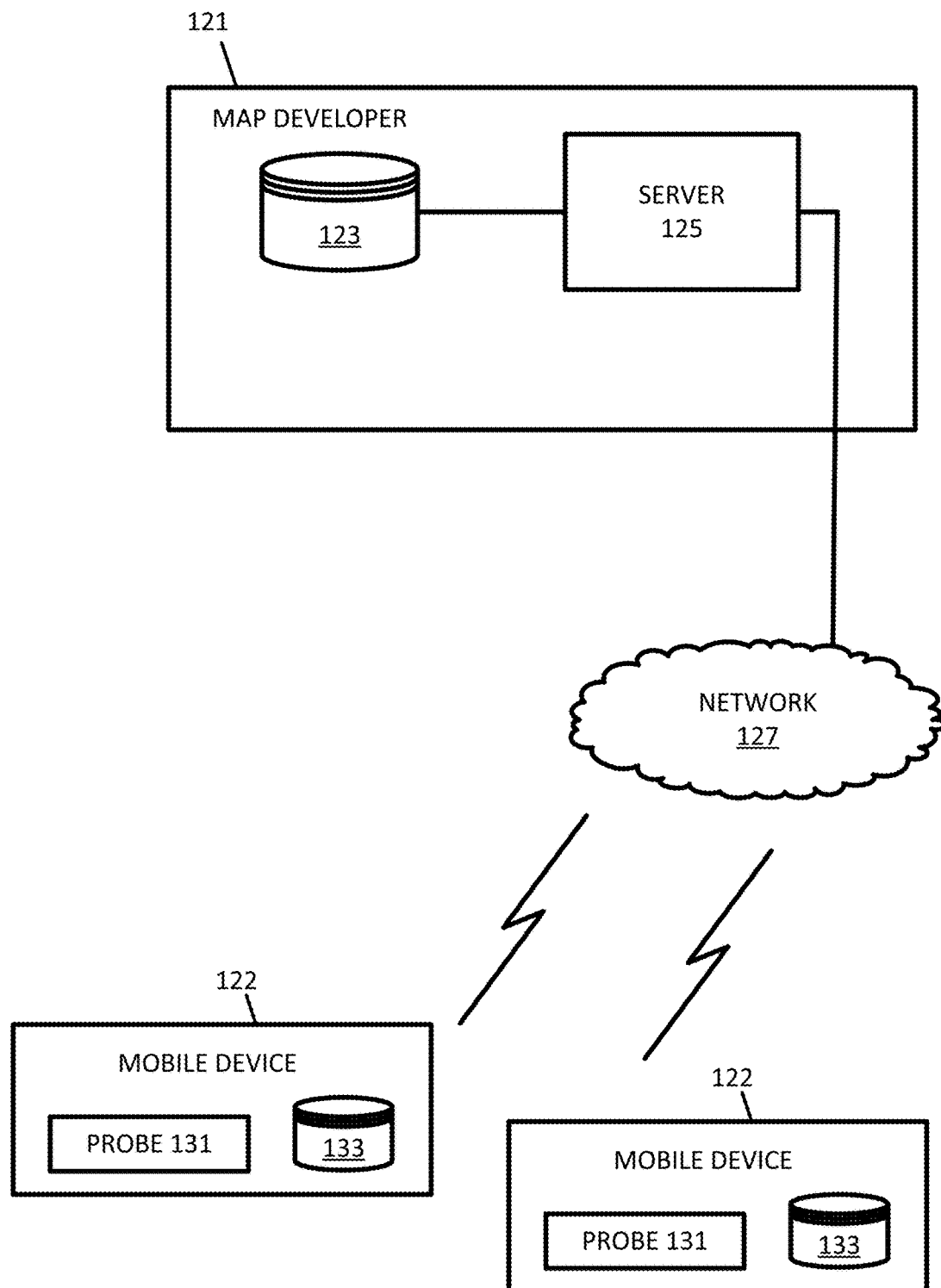
FIG. 3 illustrates an example system for map updates.

FIG. 3 illustrates an example system 120 for map database and SPaT information updates. In FIG. 3, one or more mobile devices 122 include probes 131 and are connected to the server 125 though the network 127. A database 123, including the server map and SPaT information database, is also connected to the server 125. The server map may include a lane model, a localization model, and associated traffic light signal information. The database 123 and the server 125 make up a developer system 121. The developer system 121 is used to generate server map updates, including SPaT information updates, based on data collected by the probes 131. Multiple mobile devices 122 are connected to the server 125 through the network 127. The mobile devices 122 may serve as probes 131 or be coupled with probes 131. The probes 131 collect traffic information used by the developer system 121 to update the server map and SPaT information. The mobile devices 122 may also include autonomous vehicles. The mobile devices 122 include databases 133 corresponding to device maps and SPaT information. The device maps may be updated based on the server map and SPaT information. Additional, different, or fewer components may be included.

For example, traffic information is collected by data collection vehicles and/or other mobile devices 122 to update the server map and SPaT information at the server 125. The data collection vehicles and/or other mobile devices 122 do not update vehicle maps and SPaT information directly. Instead, the data collection vehicles and/or other mobile devices 122 capture sensor data using probes 131, and upload the sensor data to the server 125 for updating SPaT information based on the sensor data. The server 125 sends out periodic map and SPaT information updates to the data collection vehicles and/or other mobile devices 122 based on aggregating sensor data from the mobile devices 122 and updating the server map and SPaT information using the aggregated sensor data. For example, autonomous vehicles, navigation devices, and augmented reality devices receive map and SPaT information updates from the server for localizing the vehicles and devices in an environment and providing navigation and driving instructions based on a local map database 143 and the associated SPaT information.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Communication between the mobile devices 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

Figure 4:
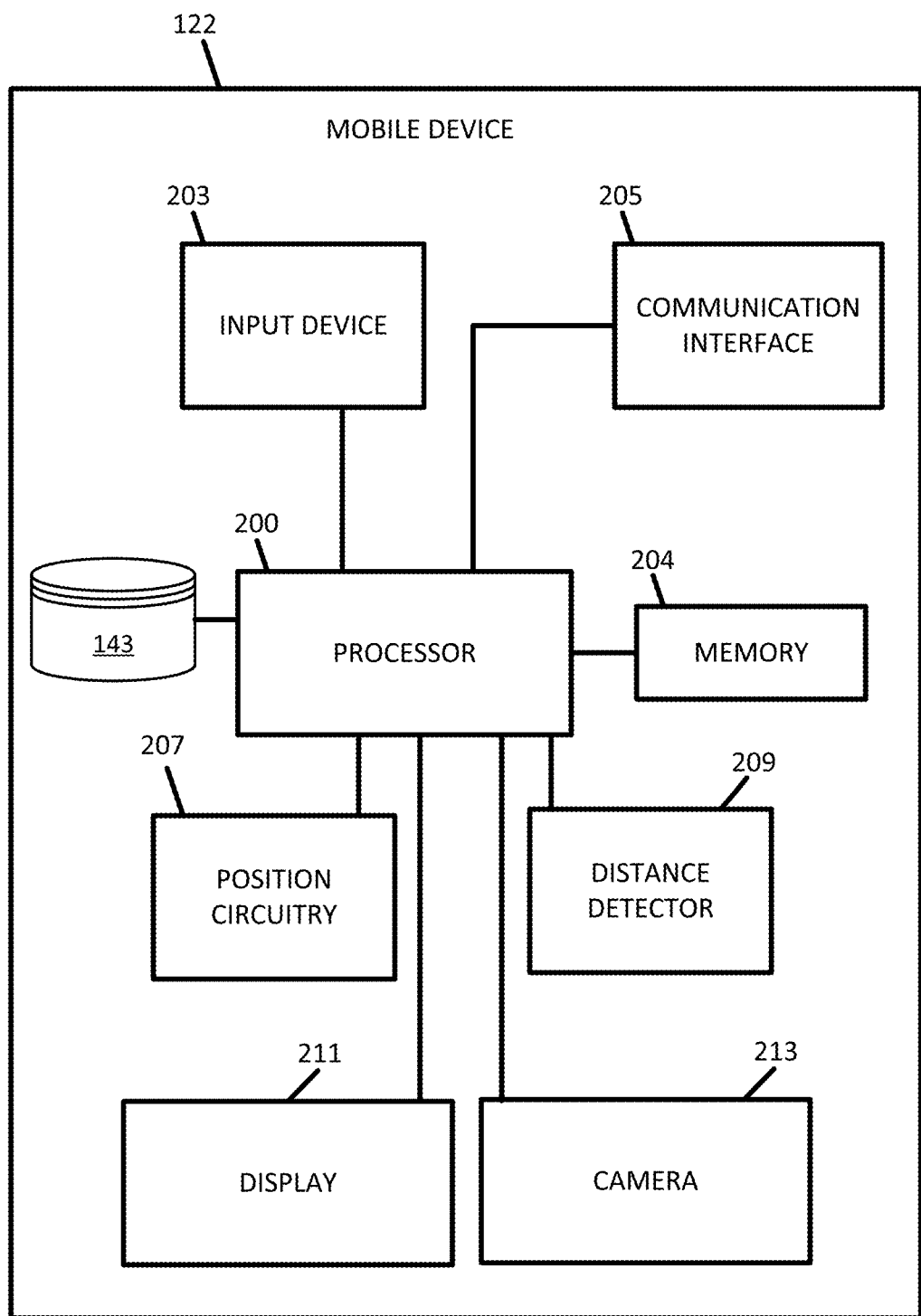
FIG. 4 illustrates an example mobile device.

FIG. 4 illustrates an example mobile device. The mobile device 122 may be configured to perform a method for generating vehicle instructions based on a SPaT information adjustment. The mobile device 122 is configured to receive map data, including SPaT information for a plurality of traffic signals. The mobile device 122 then generates, based on receiving a phase and timing adjustment notification for a traffic signal, a vehicle instruction based on the adjusted phase and timing and the abnormal status of the traffic signal. The phase and timing adjustment notification includes a normal or abnormal status for the traffic signal. In an example, the vehicle instruction is a driving instruction for an autonomous vehicle, a highly assisted driving vehicle, or another vehicle. The driving instruction may control an action of an autonomous vehicle, such as by navigating the autonomous vehicle to a destination based on the abnormal status, predicted duration of the abnormal status, other information based on the abnormal status. In another example, the vehicle instruction is a navigation instruction with an alternative route based on a predicted duration of the abnormal status.

Accordingly, FIG. 4 illustrates an exemplary mobile device 122 of the system of FIG. 3. As discussed above, the mobile device 122 may be configured as an autonomous vehicle, augmented reality device, etc. The mobile device 122 includes a processor 200, a map database 143, a memory 204, an input device 203, a communication interface 205, position circuitry 207, a distance detector 209, a display 211, and a camera 213. Additional, different, or fewer components are possible for the mobile device 122.

The distance detector 209 is configured to receive sensor data indicative of traffic and roadway information indicative of a current or future change to SPaT information for a traffic light signal. The distance detector 209 may emit a signal and detect a return signal. The signal may be a laser signal, a radio signal, or a sound signal. The distance detector 209 may determine a vector (distance and heading) from the position of the mobile device 122 to a traffic event. Alternatively or additionally, the distance detector 209 and/or camera 213 may be configured to receive sensor indicative of the traffic information. The sensor data collected by the distance detector 209 and/or the images collected by the camera 213 may be analyzed to determine traffic flow, traffic incidents, emergency vehicles, or other traffic events.

The position detector or position circuitry 207 is configured to determine a geographic position associated with mobile device 122. The geographic position may be determined based on a position of the vehicle when collecting the sensor data for traffic information and used by server 125 to update map database 123.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS, Gallileo, Baidu or similar), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The mobile device 122 may be integrated in a vehicle, which may include a data collection vehicle, assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, accelerate, decelerate, or otherwise control the vehicle based on the vehicle database 133, including road attributes and SPaT information. The autonomous vehicle senses the environment surrounding the vehicle using distance detector 209 and matches the environment to map database 143 to identify traffic light signals near the vehicle. The autonomous vehicle may also use position circuitry 207 to match the environment to the map database 143. For example, the autonomous vehicle senses roadside objects, and based on matching the objects to the map database, a position and orientation of the autonomous vehicle may be determined. After determining the position and orientation of the autonomous vehicle, the system may navigate and control the vehicle.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering, accelerating, braking, or another action. in response to the vehicle database 133, including the SPaT information. The HAD vehicle senses the environment surrounding the vehicle using distance detector 209 and matches the environment to map database 143 and SPaT information. The HAD vehicle may also use position circuitry 207 to match the environment to the map database 143 and SPaT information. For example, the HAD vehicle senses roadside objects, and based on matching the objects to the map database, a position and orientation of the HAD vehicle may be determined. After determining the position and orientation of the HAD vehicle, the HAD vehicle may navigate and control the vehicle.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the traffic estimation level of a current or upcoming road link based on the vehicle database 133, including the SPaT information. The ADAS vehicle senses the environment surrounding the vehicle using distance detector 209 and matches the environment to map database 143 and SPaT information. The ADAS vehicle may also use position circuitry 207 to match the environment to the map database 143 and SPaT information. For example, the ADAS vehicle senses roadside objects, and based on matching the objects to the map database, a position and orientation of the ADAS vehicle may be determined. After determining the position and orientation of the ADAS vehicle, the ADAS vehicle may navigate and control the vehicle.

The mobile device 122 may generate a routing instruction based on the vehicle database 133 and SPaT information. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The navigation device 122 may then provide the end user with information about the optimum route in the form of guidance that identifies the maneuvers required to be taken by the end user to travel from the origin to the destination location. Some mobile device 122 show detailed maps on displays outlining the route, the types of maneuvers to be taken at various locations along the route, locations of certain types of features, and so on.

The mobile device 122 may plan a route through a road system, or modify a current route through a road system based on the matched probe data. The route may extend from a current position of the mobile device or an origin to a destination through the road segment matched with the probe data. Possible routes may be calculated based on a Dijkstra method, an A-star algorithm or search, and/or other route exploration or calculation algorithms that may be modified to take into consideration assigned cost values of the underlying road segments. Various other aspects, such as distance, non-navigable areas, and/or restrictions, may be considered in addition to the cost to determine an optimum route.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 800 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123, 133, 143, or another database may include geographic data and SPaT information used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections, such as the SPaT information. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, SPaT information and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, or other landmarks. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, or other landmarks. The geographic data may additionally or alternatively include other data records such as, for example, POI data records, topographical data records, cartographic data records, routing data, and maneuver data.

The databases may include historical traffic speed data and SPaT information for one or more road segments. The databases may also include real-time traffic attributes and SPaT information adjustments for one or more road segments. A traffic attribute may indicate that a road segment has a high probability of traffic congestion and/or delays.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface 211 may also include audio capabilities, or speakers. In an embodiment, the input device 203 may involve a device having velocity detecting abilities.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information, such as SPaT information, to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 5:
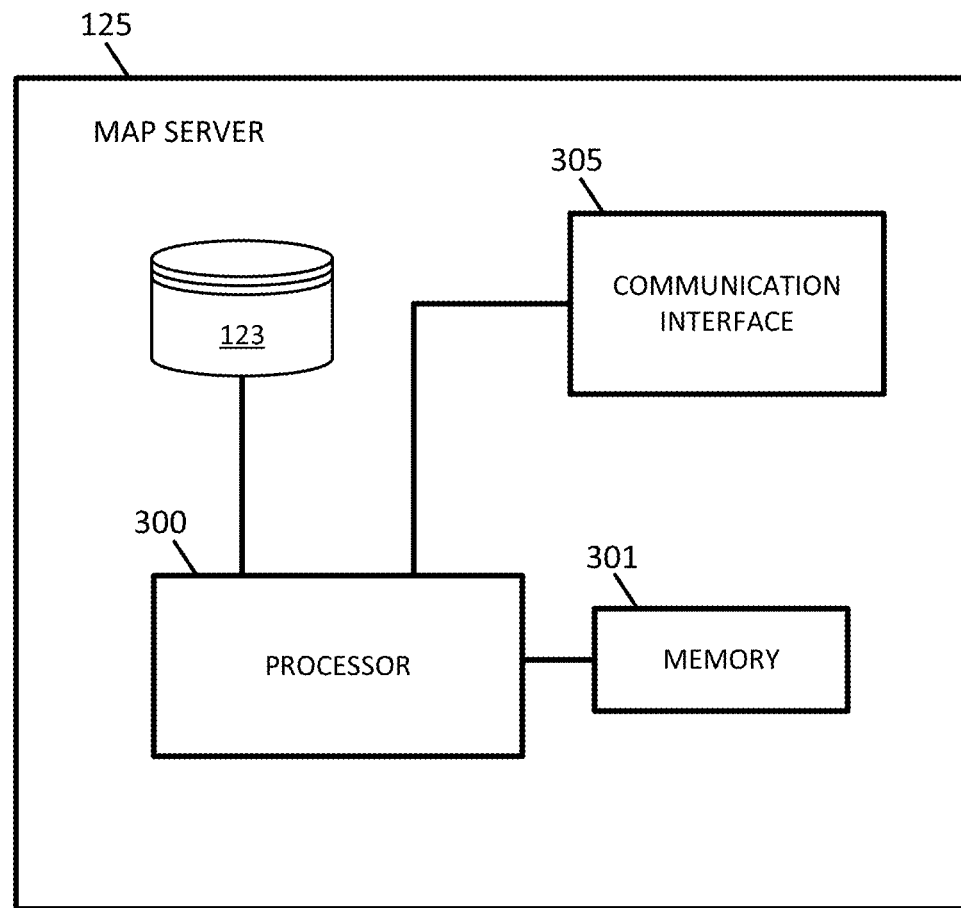
FIG. 5 illustrates an example server.

FIG. 5 illustrates an example server 125, which may apply to the system of FIG. 3. The server 125 includes a processor 300, a communication interface 305, a memory 301, and a database 123. An input device (e.g., keyboard or personal computer) may be used to enter settings to the server 125. The database 123 may include the server map, such as including SPaT information. Additional, different, or fewer components may be provided in the server 125. FIG. 1 (discussed above) illustrates an example flowchart for the operation of server 125. Additional, different, or fewer acts may be provided.

The geographic database 123 includes traffic signal information for a traffic signal. The traffic signal information may include a government agency traffic signal timing plan (e.g., SPaT information), traffic flow information, traffic incident information, emergency vehicle information, etc. Additional and different traffic signal information may be provided.

The memory 301 is configured to store data temporarily from the database 123 and to store adjusted traffic signal information (e.g., SPaT information adjustments). Portions of the database 123 are loaded into memory 301 for use by processor 300.

The communication interface 305, such as a backend cloud network, is configured to receive adjusted traffic signal information (e.g., SPaT information adjustments). The communication interface 305 also configured to transmit updated map data (e.g., based on the adjusted traffic signal information) to mobiles devices, autonomous vehicles, navigation devices, and augmented reality devices. Alternatively or additionally, the communication interface 305 also configured to transmit navigation information and instructions, as well as notifications, based on the adjusted traffic signal information to mobiles devices, autonomous vehicles, navigation devices, and augmented reality devices.

The processor 300, such as a SPaT process engine, is configured to generate map updates and notifications based on the adjusted traffic signal information (SPaT information adjustments) for the mobiles devices, autonomous vehicles, navigation devices, and augmented reality devices.

Figure 6:
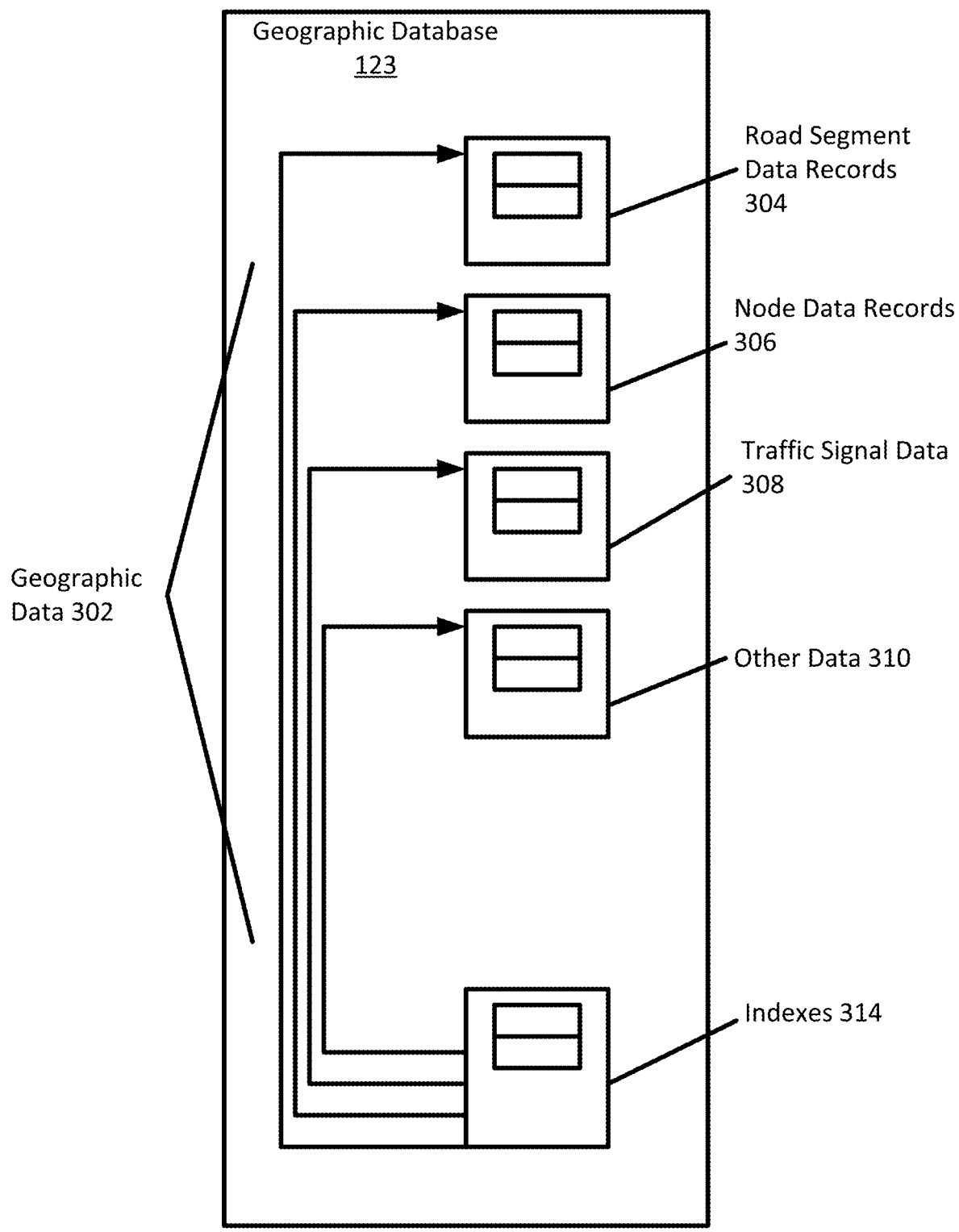
FIG. 6 illustrates an example geographic database.

In FIG. 6, the geographic database 123 may contain at least one road segment database record 304 (also referred to as "entity" or "entry") for each road segment in a particular geographic region. Any of the features of geographic database 123 may be applied to local databases 133. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include traffic signal data 308. The traffic signal data 308 may include may include a government agency traffic signal timing plan (e.g., SPaT information), traffic flow information, traffic incident information, emergency vehicle information, or other traffic event information. Additional and different traffic signal information may be provided. For example, adjusted traffic signal data (e.g., SPaT information adjustments) may be received and stored with the traffic signal data 308.

The geographic database 123 may include other kinds of data 310. The other kinds of data 310 may represent other kinds of geographic features or anything else. The other kinds of data may include point of interest (POI) data. For example, the POI data may include POI records comprising a type (e.g., the type of POI, such as restaurant, hotel, city hall, police station, historical marker, ATM, golf course, etc.), location of the POI, a phone number, hours of operation, or other information.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304. As another example, the indexes 314 may relate traffic signal data 308 (SPaT information) with a road segment in the segment data records 304 or a geographic coordinate. An index 314 may, for example, store data relating to one or more traffic signal data attributes 308 for each location and/or traffic signal.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 relevant for this invention are: temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data and SPaT information for one or more road segments. The geographic database 123 may also include traffic attributes for one or more road segments. A traffic attribute may indicate that a road segment has a high probability of traffic congestion based on a SPaT information adjustment.

Figure 7:
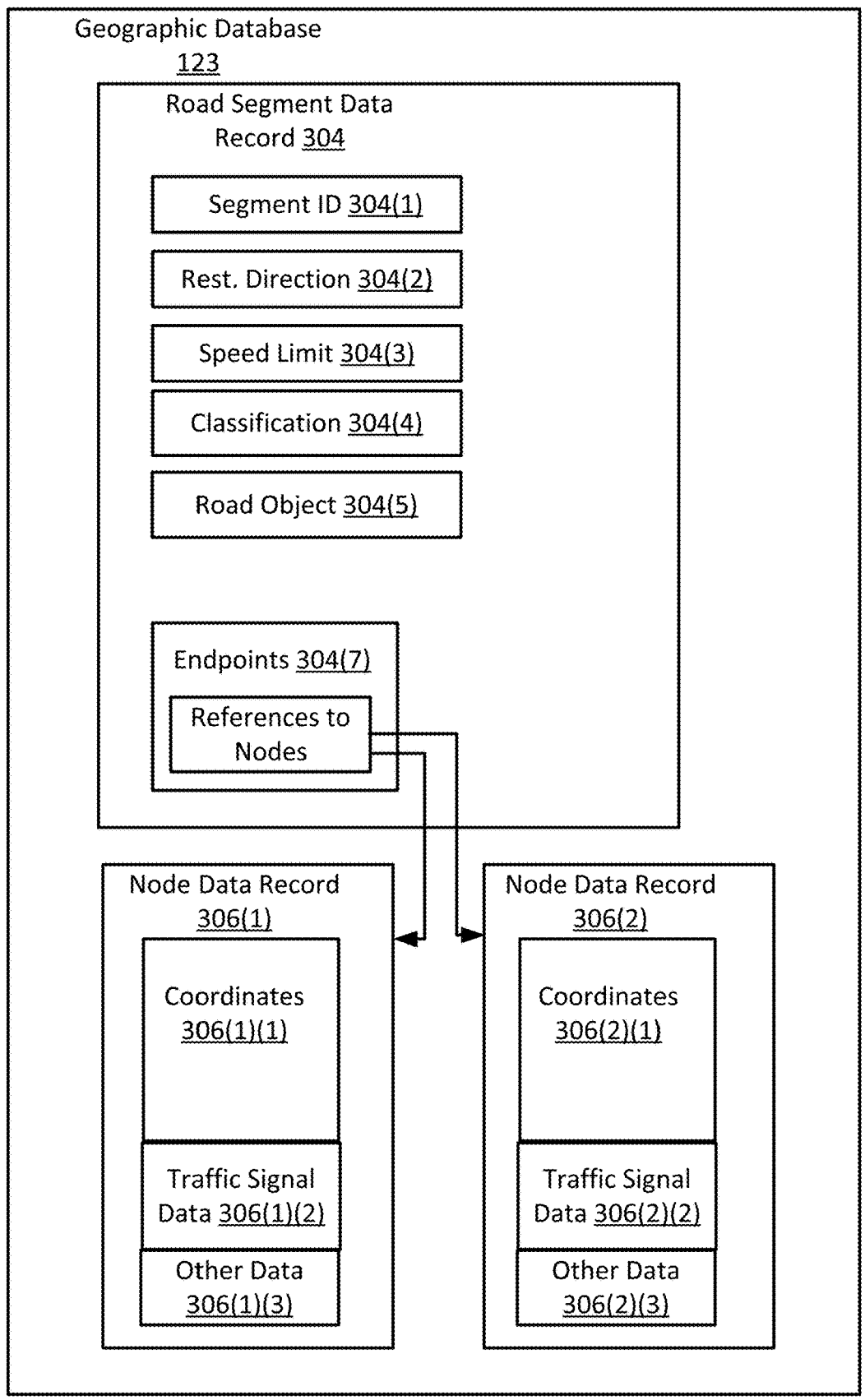
FIG. 7 illustrates another example geographic database.

FIG. 7 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes. The geographic database 123 may provide different display information relating to where open parking spots may exist, for example.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 7 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and traffic signal data 306(1)(2) and 306(2)(2). For example, the traffic signal objects 306(1)(2), 306(2)(2) may include a government agency traffic signal timing plan (e.g., SPaT information), traffic flow information, traffic incident information, emergency vehicle information, etc. The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the predicted parking availability data stored in the geographic database 123. Data including a government agency traffic signal timing plan (e.g., SPaT information), traffic flow information, traffic incident information, emergency vehicle information and changes to the data may also be stored for generating notifications and navigational and driving instructions.

Embodiment 1

A method for generating traffic signal adjustment notifications, the method comprising:

receiving, by a signal phase and timing process engine, traffic data for a predetermined road segment, the traffic data comprising flow data, incident data and emergency vehicle data;

deriving, by the signal phase and timing process engine based on the received traffic data, an abnormal status for a traffic signal in for the predetermined road segment;

adjusting, by the signal phase and timing process engine, a phase and timing for the traffic signal based on the received traffic data; and generating, by the signal phase and timing process engine, a vehicle notification based on the abnormal status and the phase and timing for the traffic signal.

Embodiment 2

The method of claim 1, further comprising:
transmitting, by the signal phase and timing process engine with a backend network, the vehicle notification to a vehicle associated with the predetermined road segment.

Embodiment 3

The method of claim 1, wherein deriving the abnormal status comprises predicting a duration of the abnormal status.

Embodiment 4

The method of claim 1, wherein the abnormal status is indicative of a reason for adjusting the phase and timing for the traffic signal.

Embodiment 5

The method of claim 3, wherein the vehicle notification comprises a navigation instruction based on the predicted duration of the abnormal status.

Embodiment 6

The method of claim 5, wherein the navigation instruction provides an alternative route based on the predicted duration of the abnormal status.

Embodiment 7

The method of claim 3, wherein the vehicle notification comprises a driving instruction based on the predicted duration of the abnormal status.

Embodiment 8

The method of claim 7, wherein the driving instruction is configured for control of an autonomous vehicle.

Embodiment 9

The method of claim 1, wherein the vehicle notification comprises a driver warning based on the abnormal status and the phase and timing for the traffic signal, the warning indicative of an adjustment to the phase and timing for the traffic signal and a reason for the adjustment.

Embodiment 10

An apparatus for notifying vehicles of a traffic signal phase and timing change, the apparatus comprising:
a traffic signal database configured to store traffic signal information, the traffic signal information comprising traffic flow information, traffic incident information, emergency vehicle information and traffic signal phase and timing information;
a traffic signal phase and timing processing engine configured to modify a phase and timing for the traffic signal based on an abnormal status derived from the traffic signal information retrieved from the traffic signal database and to generate a change notification for vehicles approaching the traffic signal, the change notification comprising modified traffic signal phase and timing information for the traffic signal and the abnormal status;
a network interface for communicating the change notification to a vehicle communications system.

Embodiment 11

The apparatus of claim 10, wherein at least a portion of the traffic signal information comprises government agency traffic signal timing information indicative of a current state of the traffic signal and timing for future changes to the current state of the traffic signal.

Embodiment 12

The apparatus of claim 10, wherein at least a portion of the traffic signal information is received from a plurality of vehicles via a mobile network.

Embodiment 13

The apparatus of claim 10, wherein the vehicle communications system comprises a dedicated short range vehicle communications (DSRC) system for the traffic signal.

Embodiment 14

The apparatus of claim 10, wherein the vehicle communications system comprises a WiFi communication module for the traffic signal.

Embodiment 15

The apparatus of claim 10, wherein the vehicle communications system comprises a LiFi communication module for the traffic signal.

Embodiment 16

The apparatus of claim 10, wherein the vehicle communications system comprises a cellular communication module for the traffic signal.

Embodiment 17

A method for generating vehicle instructions based on a traffic signal phase and timing adjustment, the method comprising:
receiving, by a mobile device associated with a vehicle, map data comprising phase and timing information for a plurality of traffic signals;
receiving, by the mobile device associated with the vehicle, a phase and timing adjustment notification for a traffic signal, the phase and timing adjustment notification comprising an abnormal status for the traffic signal; and
generating, by the mobile device associated with the vehicle, a vehicle instruction based on the phase and timing adjustment notification and the abnormal status of the traffic signal.

Embodiment 18

The method of claim 17, wherein the vehicle instruction comprises a driving instruction for an autonomous vehicle or a highly assisted driving vehicle.

Embodiment 19

The method of claim 18, further comprising:
controlling an action of the autonomous vehicle or the highly assisted driving vehicle based on the vehicle instruction.

Embodiment 20

The method of claim 19, wherein controlling the action of the autonomous vehicle or the highly assisted driving vehicle comprises navigating the autonomous vehicle or the highly assisted driving vehicle to a destination based on the abnormal status.

Embodiment 21

The method of claim 20, wherein navigating the autonomous vehicle to a destination is further based on a predicted duration of the abnormal status.

Embodiment 22

The method of claim 17, wherein the vehicle instruction comprises a navigation instruction.

Embodiment 23

The method of claim 22, wherein the navigation instruction comprises an alternative route based on a predicted duration of the abnormal status.

We claim:

1. A method for generating traffic signal adjustment notifications, the method comprising:
   receiving, by a signal phase and timing process engine, traffic data for a predetermined road segment;
   deriving, by the signal phase and timing process engine based on the received traffic data, an abnormal status of operation of for a traffic signal for the predetermined road segment
   adjusting, by the signal phase and timing process engine, a phase and timing for the traffic signal based on the received traffic data;
   determining, by the signal phase and timing process engine based on the received traffic data, a reason for adjusting the phase and timing for the traffic signal;
   generating, by the signal phase and timing process engine, a vehicle notification based on (i) the abnormal status of operation of the traffic signal and (ii) the adjusted phase and timing for the traffic signal, wherein the generated vehicle notification indicates (i) the abnormal status of operation of the traffic signal and (ii) the reason for adjusting the phase and timing for the traffic signal; and
   transmitting, by the signal phase and timing process engine with a backend network, the vehicle notification to a vehicle associated with the predetermined road segment.

2. The method of claim 1, wherein deriving the abnormal status comprises predicting a duration of the abnormal status.

3. The method of claim 2, wherein the vehicle notification comprises a driving instruction based on the predicted duration of the abnormal status.

4. The method of claim 3, wherein the driving instruction includes navigation data.

5. The method of claim 4, wherein the navigation data provides an alternative route based on the predicted duration of the abnormal status.

6. The method of claim 3, wherein the driving instruction is configured for control of an autonomous vehicle.

7. The method of claim 1, wherein the vehicle notification comprises a driver warning based on the abnormal status and the phase and timing for the traffic signal, the warning indicative of an adjustment to the phase and timing for the traffic signal and a reason for the adjustment.

8. The method of claim 1, wherein the abnormal status is based on traffic light outage information or emergency vehicle data.

9. The method of claim 1, wherein the duration of the abnormal status is predicted using historical data.

10. An apparatus for notifying vehicles of a traffic signal phase and timing change, the apparatus comprising:
    a traffic signal database configured to store traffic signal information, the traffic signal information comprising traffic signal phase and timing information for a traffic signal;
    a traffic signal phase and timing processing engine configured to modify a phase and timing for the traffic signal based on an abnormal status of operation of the traffic signal and a reason for modifying the phase and timing for the traffic signal, the abnormal status and the reason for modifying the phase and timing for the traffic signal are derived from the traffic signal information retrieved from the traffic signal database,
    the traffic signal phase and timing processing engine further configured to generate a change notification for vehicles approaching the traffic signal, the change notification comprising modified traffic signal phase and timing information for the traffic signal, the abnormal status, and the reason for modifying the phase and timing for the traffic signal; and
    a network interface for communicating the change notification to a vehicle communications system.

11. The apparatus of claim 10, wherein at least a portion of the traffic signal information comprises government agency traffic signal timing information indicative of a current state of the traffic signal and timing for future changes to the current state of the traffic signal.

12. The apparatus of claim 10, wherein at least a portion of the traffic signal information is received from a plurality of vehicles via a mobile network.

13. The apparatus of claim 10, wherein the vehicle communications system comprises a dedicated short range vehicle communications (DSRC) system for the traffic signal.

14. The apparatus of claim 10, wherein the vehicle communications system comprises a WiFi communication module for the traffic signal.

15. The apparatus of claim 10, wherein the vehicle communications system comprises a LiFi communication module for the traffic signal.

16. The apparatus of claim 10, wherein the vehicle communications system comprises a cellular communication module for the traffic signal.

17. A method for generating vehicle instructions based on a traffic signal phase and timing adjustment, the method comprising:
    receiving, by a mobile device associated with a vehicle, map data comprising phase and timing information for a plurality of traffic signals;
    receiving, by the mobile device associated with the vehicle, a phase and timing adjustment notification for a traffic signal, the phase and timing adjustment notification comprising an abnormal status for operation of the traffic signal; and generating, by the mobile device associated with the vehicle, a vehicle instruction based on (i) the abnormal status of operation of the traffic signal and (ii) the phase and timing adjustment notification for the traffic signal, wherein the generated vehicle notification indicates the abnormal status of operation of the traffic signal and a reason for the abnormal status.

18. The method of claim 17, wherein the vehicle instruction comprises a driving instruction for an autonomous vehicle or a highly assisted driving vehicle.

19. The method of claim 18, further comprising:

controlling an action of the autonomous vehicle or the highly assisted driving vehicle based on the vehicle instruction.

20. The method of claim 19, wherein controlling the action of the autonomous vehicle or the highly assisted driving vehicle comprises navigating the autonomous vehicle or the highly assisted driving vehicle to a destination based on the abnormal status.

21. The method of claim 20, wherein navigating the autonomous vehicle to a destination is further based on a predicted duration of the abnormal status.

22. The method of claim 17, wherein the vehicle instruction comprises navigation data.

23. The method of claim 22, wherein the navigation data comprises an alternative route based on a predicted duration of the abnormal status.

* * * * *